United States Patent [19]

Imaizumi et al.

[11] Patent Number: 5,805,132
[45] Date of Patent: Sep. 8, 1998

[54] IMAGE EDITING APPARATUS CAPABLE OF SETTING IMAGE PROCESSING REGION ON DISPLAY SCREEN

[75] Inventors: Shoji Imaizumi, Shinshiro; Keiji Kusumoto; Kenichi Muroki, both of Toyokawa, all of Japan

[73] Assignee: Minolta Co., Ltd., Osaka, Japan

[21] Appl. No.: 796,966

[22] Filed: Feb. 7, 1997

Related U.S. Application Data

[63] Continuation of Ser. No. 941,191, Sep. 3, 1992, abandoned.

[30] Foreign Application Priority Data

| Sep. 17, 1991 | [JP] | Japan | 3-267199 |
| Sep. 17, 1991 | [JP] | Japan | 3-267200 |
| Sep. 17, 1991 | [JP] | Japan | 3-267201 |

[51] Int. Cl.[6] .................................................. G09G 5/00
[52] U.S. Cl. ...................... 345/112; 345/127; 345/145
[58] Field of Search ............................ 345/115, 123, 345/127, 132, 146, 159, 160, 112, 145; 395/139; 382/232, 298

[56] References Cited

U.S. PATENT DOCUMENTS

| 4,586,035 | 4/1986 | Baker et al. | 345/146 |
| 4,686,522 | 8/1987 | Hernandez et al. | 340/721 |
| 4,837,635 | 6/1989 | Santos | 358/287 |
| 4,931,783 | 6/1990 | Atkinson | 340/721 |
| 4,941,057 | 7/1990 | Lehmbeck et al. | 358/401 |
| 5,051,927 | 9/1991 | Tada et al. | 395/139 |
| 5,065,346 | 11/1991 | Kawai et al. | 395/128 |
| 5,073,771 | 12/1991 | Satta et al. | 340/721 |
| 5,079,724 | 1/1992 | Shiraki et al. | 345/127 |
| 5,119,081 | 6/1992 | Ikehira | 345/132 |
| 5,136,399 | 8/1992 | Aoyama | 345/150 |
| 5,172,103 | 12/1992 | Kita | 345/127 |
| 5,185,598 | 2/1993 | Sakamoto | 340/721 |
| 5,230,063 | 7/1993 | Hoebert et al. | 345/146 |
| 5,333,247 | 7/1994 | Gest et al. | 345/123 |

FOREIGN PATENT DOCUMENTS

| 59-106037 | 6/1984 | Japan . |
| 2-294687 | 5/1990 | Japan | 345/157 |

*Primary Examiner*—Amare Mengistu
*Attorney, Agent, or Firm*—Sidley & Austin

[57] ABSTRACT

An image editing apparatus includes an image display apparatus for displaying a read image. An area of an image region displayed in the image display apparatus is determined by the size of the read image. At the time of image editing processing, a frame for indicating the image editing region is displayed on a screen of the display apparatus. A desired region is designated by shifting the frame. The frame is allowed to shift only in a region wherein the image is displayed on the screen.

8 Claims, 15 Drawing Sheets

IMAGE EDITING APPARATUS CAPABLE OF SETTING IMAGE PROCESSING REGION ON DISPLAY SCREEN

This application is a continuation, of application Ser. No. 07/941,191 filed Sep. 3, 1992 abandoned.

BACKGROUND OF THE INVENTION

1. Field of the Invention

The present invention relates to image editing apparatus such as film scanners, and more particularly, to image editing apparatus capable of readily setting editing regions.

2. Description of the Related Art

A film scanner is a device which optically reads an original image from a photographic film (hereinafter simply referred to as a "film") and outputs the image as an image signal. The device is provided with an image display device for monitoring an output image and is capable of editing the image such as trimming of an original image (extraction of part of the image) and expanding and reducing the image.

In general, such a film scanner is used in combination with a color printer. The color printer forms a hard copy image corresponding to an original image (hereinafter referred to as a "film image") in response to an image signal output from the film scanner.

A conventional film scanner is provided with a display device such as a liquid crystal display using an entire display screen as an image display region, and an operation panel with various operation keys arranged thereon. Various operations including those for image editing are instructed based on a key input system.

In other words, an operator conventionally designates an image editing mode by selectively operating operation keys corresponding to a desired operation on an operation panel provided separately from an image display screen.

For example, for designating a trimming region, an operator presses a trimming key on the operation panel, with a film image displayed on the screen. Then, a trimming mode is set to display a frame line (hereinafter referred to as "trimming frame") indicative of an outline of the trimming region overlapped with the film image at the center of the screen.

Then, the operator sets the trimming region to have a desired size and to be located at a desired position by adequately using a key for instructing expansion or reduction of the trimming region and four keys for moving the trimming region upwards and downwards, and rightwards and leftwards.

Thereafter, when the operator presses a key for commanding output of an image signal, an image of the trimming region in the film image is output.

A multi-function film scanner, in particular, is provided with a touch panel system operation panel having a screen for switchedly displaying selection items of operations (operation buttons) according to operation situations in order to make an operation plain simple and small in size.

A conventional scanner has an image display region of a fixed area provided on a screen. In other words, an image display region is provided, which is of a size corresponding to a largest size of a readable film image and in which images of various sizes are displayed. The image display region has a blank portion (no image is displayed) when in displaying a film image of a size other than the largest size.

An allowable extent to which a trimming frame is shifted is provided such that the trimming frame does not go out of the image display region.

An operator therefore has to determine a position of the trimming frame not to go out of the film image into the above-described blank portion with care at the time of selecting a trimming region. This makes the operation complicated and might result in selecting a portion (that is, a blank portion) other than the film image as a trimming region.

With a conventional scanner, an operator, in an operation after an image is displayed, should watch both of a display screen and an operation panel.

Thus, adopted to a scanner is an operation input system similar to that of an image forming apparatus such as CAD. According to the position input system, an image and operation selection items are displayed on the same screen and a predetermined position on the screen is designated to designate a region of the image and to select an selection item.

In other words, a display screen is divided into an image display region and an operation region equivalent to an operation panel such that the display screen is used both for image displaying and operation. Such arrangement reduces a shift length of an operator's eye gaze during operation, thereby facilitating the operation of the operator.

The position designating system includes a cursor shifting system using a track ball and a mouse and a touch panel system using touch of a screen with a pen or a finger. The cursor shifting system is particularly desirable in terms of resolution of a designated region of an image.

However, the above-described position input system does not make an operation procedure so different from that of a conventional system. For example, in order to designate a trimming region, an operator should take two-step operation including shifting a cursor to a position corresponding to a selection item of a trimming mode to designate a trimming mode and shifting the cursor to an image display region to designate the trimming region.

Therefore, when the cursor is located apart from the selection item of the trimming mode before the trimming mode is designated, the cursor shift length is increased, which is disadvantageous in operability.

SUMMARY OF THE INVENTION

Therefore, an object of the present invention is to accurately and quickly designate an image editing region in an image editing apparatus.

Another object of the present invention is to improve operability of an image editing apparatus in image processing.

A further object of the present invention is to improve operability of an image editing apparatus in designating an image editing region.

Still further object of the present invention is to move a previously designated editing region by shifting a cursor in an image editing apparatus.

The above-described objects of the present invention can be achieved by that an area of an image display region of an image editing apparatus, which reads image and edits the same on a screen, is determined by a size of a read image. An extent to which a frame line indicative of an image editing region is shifted on the display screen is limited to a region wherein the image is displayed. Therefore, no region other than that of the image is designated as an editing region. As a result, the image editing apparatus is allowed to accurately and quickly designate an image editing region.

According to another aspect of the present invention, the display screen of the image editing apparatus includes a first region for displaying an image to be edited and a second region for displaying selection items. When the cursor is located in the first region, an operation mode corresponding to image editing whose image region should be designated is automatically set and when the cursor is located in the second region, an operation mode displayed as the selected item is automatically set. As a result, operability of the image editing apparatus in image processing is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
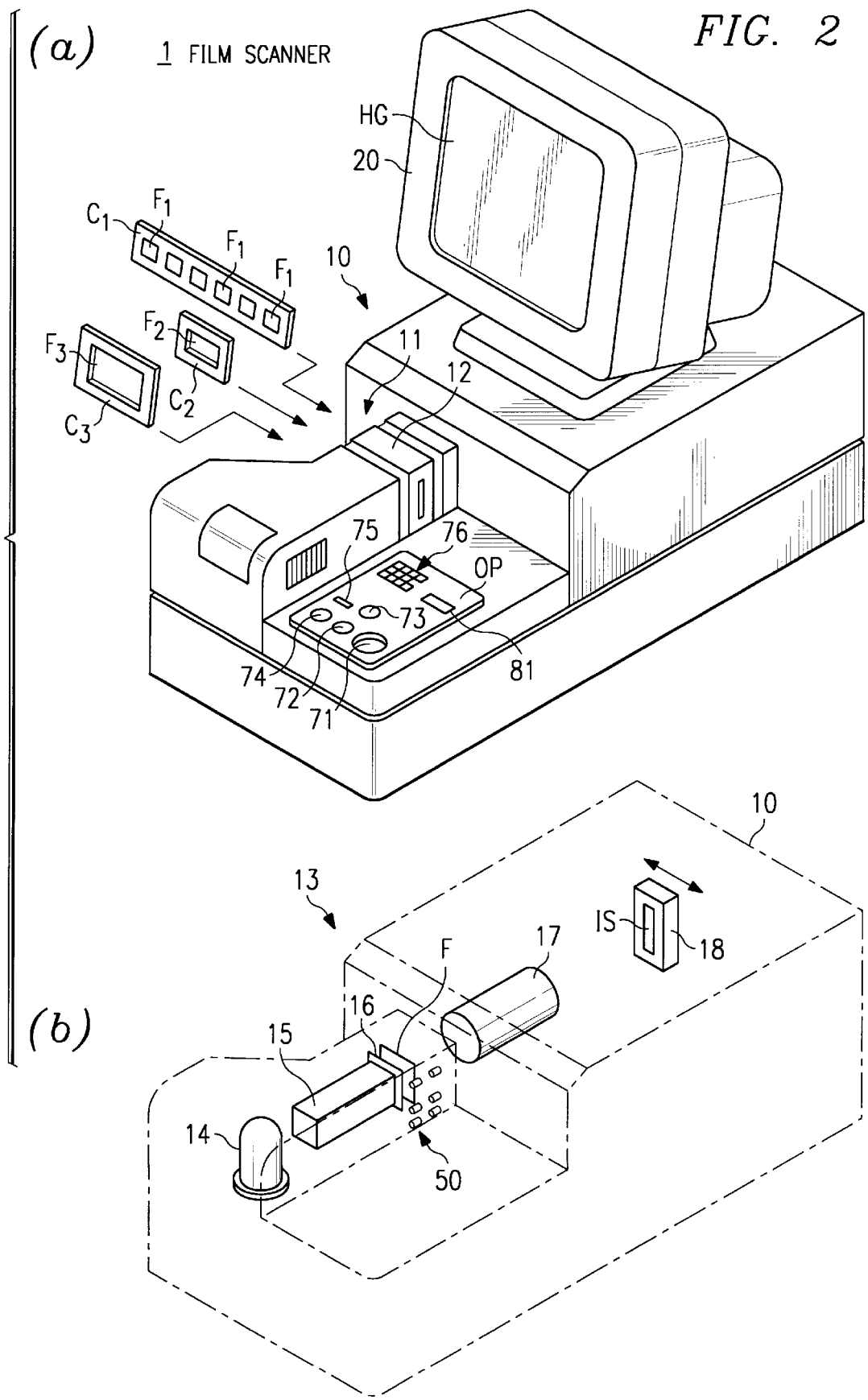
FIGS. 2(a) and 2(b) are prespective views showing a structure of the film scanner according to the present invention.

FIG. 2(a) shows an overview of a film scanner 1 and FIG. 2(b) shows an arrangement of optical members.

The film scanner 1 includes a main body 10 with an optical system 13 for reading a color film image provided therein and a CRT display 20 for displaying the read image on a display screen HG.

Provided on the upper portion of the main body 10 is a film attachment unit 11 to which a plurality of films of various sizes can be attached by a film magazine 12, such as a negative film F1 of 35 mm, a film F2 of 6 cm and a film F3 of 4×5 in.

The films F1, F2 and F3 are attached stored in frame-like film carriers C1, C2 and C3. The film F1 is comprised of a plurality of film images aligned in one direction. In the following description, when it is not necessary to specify a film size, the films F1, F2 and F3 are simply referred to as "film F".

An operation panel OP is provided on the upper surface of the main body 10. The operation panel OP is provided with a track ball 71 for shifting a cursor displayed on the display screen HG, an enter key 72 as an execution key for position designation by the cursor, an image input key 73 for commanding a start of film image reading, a print key 74 for commanding output of an image signal to an external color printer (that is, printing-out), a stop key 75 for canceling the image reading and the output of the image signal, a ten key 76 for inputting the number of prints and a print magnification, and an LED 81 for displaying the number of prints etc.

As shown in FIG. 2(b), the optical system 13 includes a light source 14 such as a halogen lamp, a mirror tunnel 15 for guiding an illumination light of the light source 14 to the film F, an optical filter 16, an image forming lens 17 and a linear image sensor IS comprising a CCD array incorporated in a scanner 18.

The scanner 18 is driven by a scanning motor (not shown) to move in parallel with a film plane and the image sensor IS separates a film image into three colors of R, G and B.

Figure 7A:
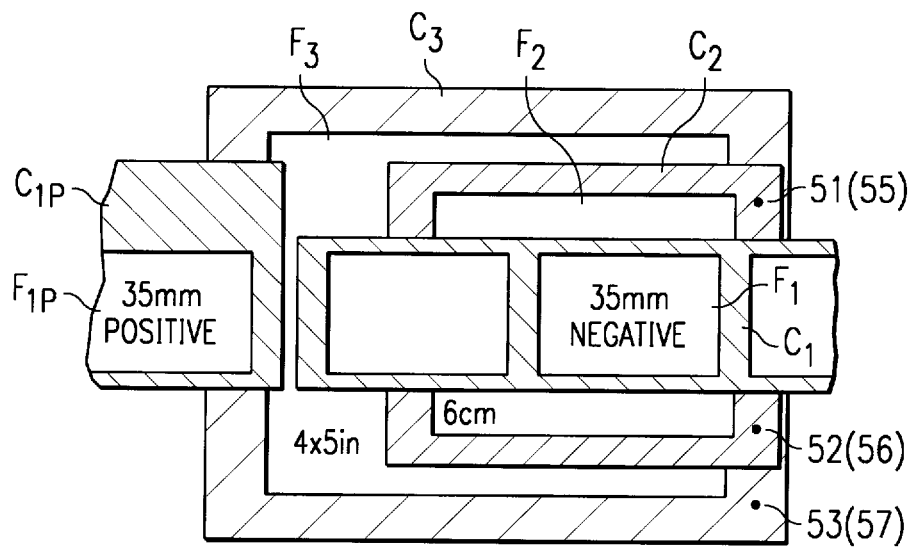
FIGS. 7(a) and 7(b) are diagrams showing a structure of a film size sensor.
Figure 7B:
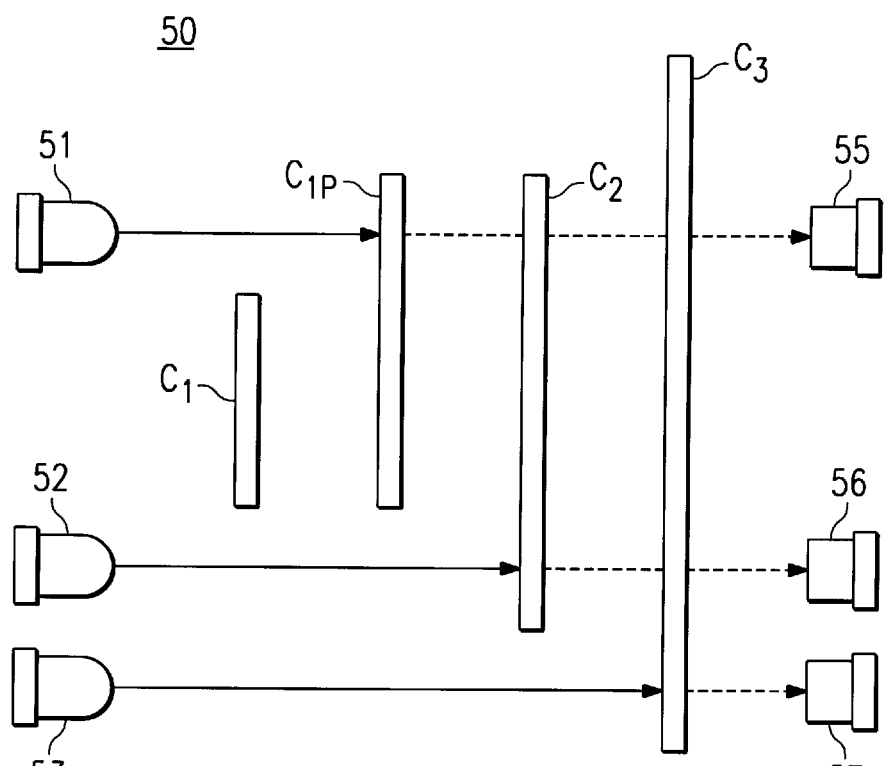

In the film scanner, a film size sensor 50 is incorporated in the film magazine 12. The film size sensor 50, as shown in FIG. 7(b), is structured by three pairs of transmissive photosensors comprised of light emitting elements 51, 52, 53 and light receiving elements 55, 56, 57 which are arranged opposing to each other at a predetermined position to sandwich the film F. Black dots in FIG. 7(a) show detection positions of the respective photosensors.

When the negative film F1 of 35 mm is attached, emitted lights of the respective light emitting elements 51, 52 and 53 are not intercepted but enter the light receiving elements 55, 56 and 57, respectively, to turn on all of the outputs of the three light receiving elements 55, 56 and 57. When a positive film F1p of 35 mm is attached, only an emitted light of the light emitting element 51 is intercepted by a film carrier C1p to turn on the outputs of the light receiving elements 56 and 57.

When the film F2 of 6 cm is attached, emitted lights of the light emitting elements 51 and 52 are intercepted by the film carrier C2 to turn on only the output of the light receiving element 57. When the film F3 of 4×5 in. is attached, all the emitted lights of the light emitting elements 51, 52 and 53 are intercepted by the film carrier C3 to turn off all the outputs of the light receiving elements 55, 56 and 57.

Figure 1:
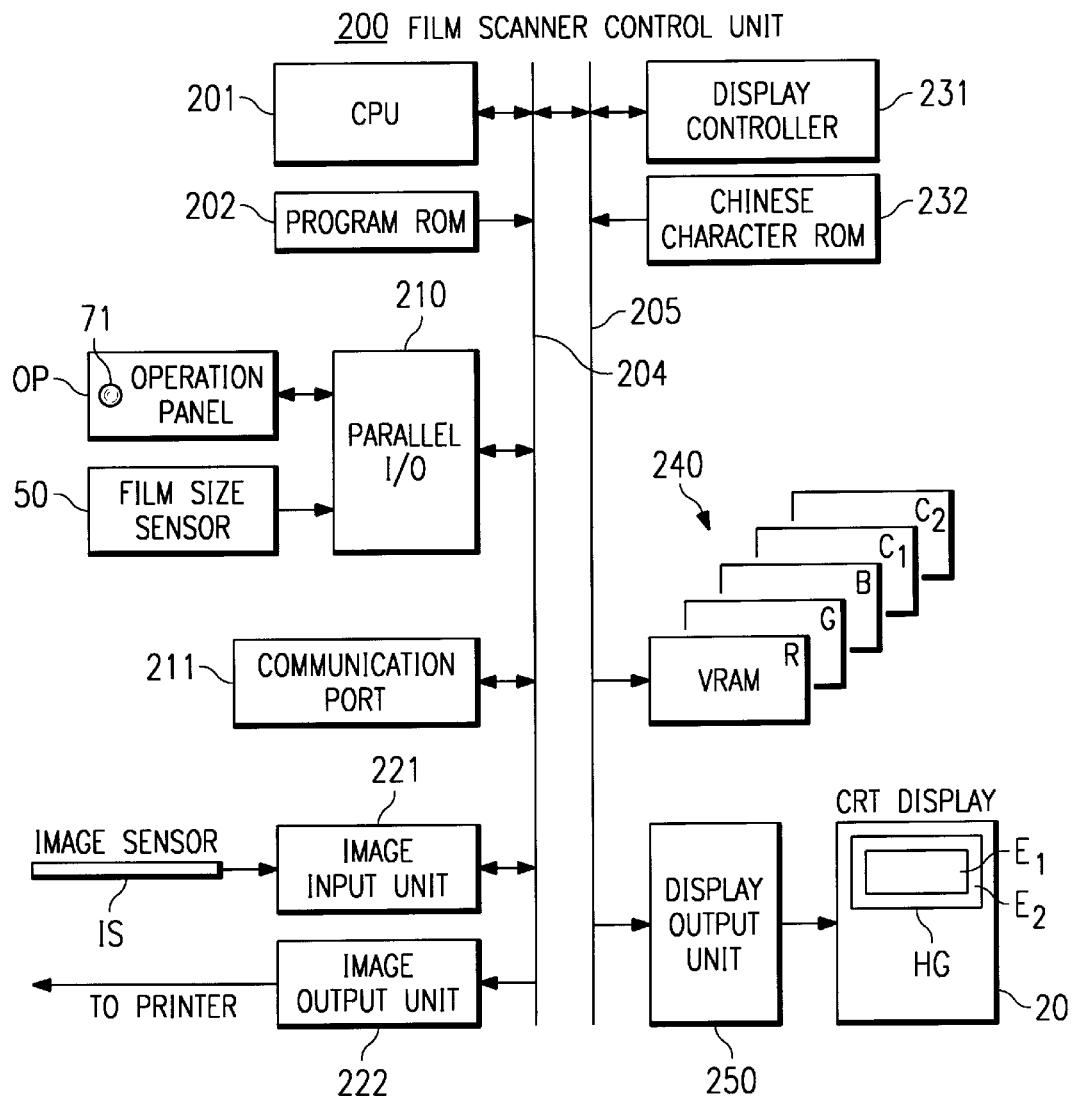
FIG. 1 is a block diagram showing a structure of a main part of a film scanner control unit according to the present invention.

FIG. 1 is a block diagram showing a structure of a main part of a film scanner control unit 200 according to the present invention.

The film scanner control unit 200 mainly includes a CPU 201 for controlling the entire film scanner 1 and a display controller (AGDC) 231 for controlling display of the CRT display 20.

Connected to the CPU 201 through a CPU data bus 204 are a program ROM 202 for storing a program for control, an input/output interface 210 for outputting control signals to respective units and inputting signals from the operation panel OP and the film size sensor 50, a communication port 211 for communicating with the printer, an image input unit 221 for inputting a photoelectric conversion signal from the image sensor IS, and an image output unit 222 for outputting image information to an external printer.

The image input unit 221 adjusts a level of a photoelectric conversion signal of each of the colors R, G and B (black level clamping), then quantatizes the photoelectric conversion signal of each color and converts the signal into 8-bit image data. At this time, shading correction is carried out by adjusting a reference voltage for A/D conversion based on reference data stored in a correction memory.

The image output unit 222 carries out color correction for image data of each color following a look-up table system in order to adapt to color reproduction characteristics of the printer and extracts and outputs image data corresponding to a trimming region when a trimming mode is selected.

Connected to the display controller 231 via an AGDC data bus 205 are a Chinese character ROM 232 for storing character codes, a VRAM240 as a virtual frame and a display output unit 250 for outputting image data to the CRT display 20.

The VRAM240 is provided with the total of five planes (frame memories) corresponding to image of each of color-separated R, G and B, fixed display elements such as operation selection items, and shift display elements such as a cursor and a trimming frame.

The display output unit 250 composes each plane of the VRAM240 and D/A-converts display data to output an analog signal of each of R, G and B as image information to the CRT display 20.

A basic operation of thus structured film scanner 1 is pressing the print key 74 after an attachment of the film F, when printed-out image of a film image is simply required. Then, the film image is read and image information corresponding to the film image is output to the printer. In this case, no display of the read image is made.

For image editing such as trimming and tone adjustment when an output image is to be monitored prior to printing-out, the image input key 73 is pressed after an attachment of the film F. As a result, a film image is read, and the read image is displayed on the display screen HG of the CRT display 20. Then, after a setting operation for image editing while watching the displayed image, the print key 74 is pressed when printed-out image is necessary. Then, another read of a film image is carried out and image information subjected to an image editing processing according to the previous setting operation is output to the printer.

In the film scanner 1, the display screen HG of the CRT display 20 is used as a monitor frame and an operation frame for a film image. In other words, the display frame HG is constituted by an image display region E1 located at the center of the frame and an operation display region E2 on the periphery of the region E1.

In the image display region E1, a blank region is displayed at an initial state after turning-on of power. After a film image is read upon a press of the image input key 73, read image is displayed.

Figure 4A:
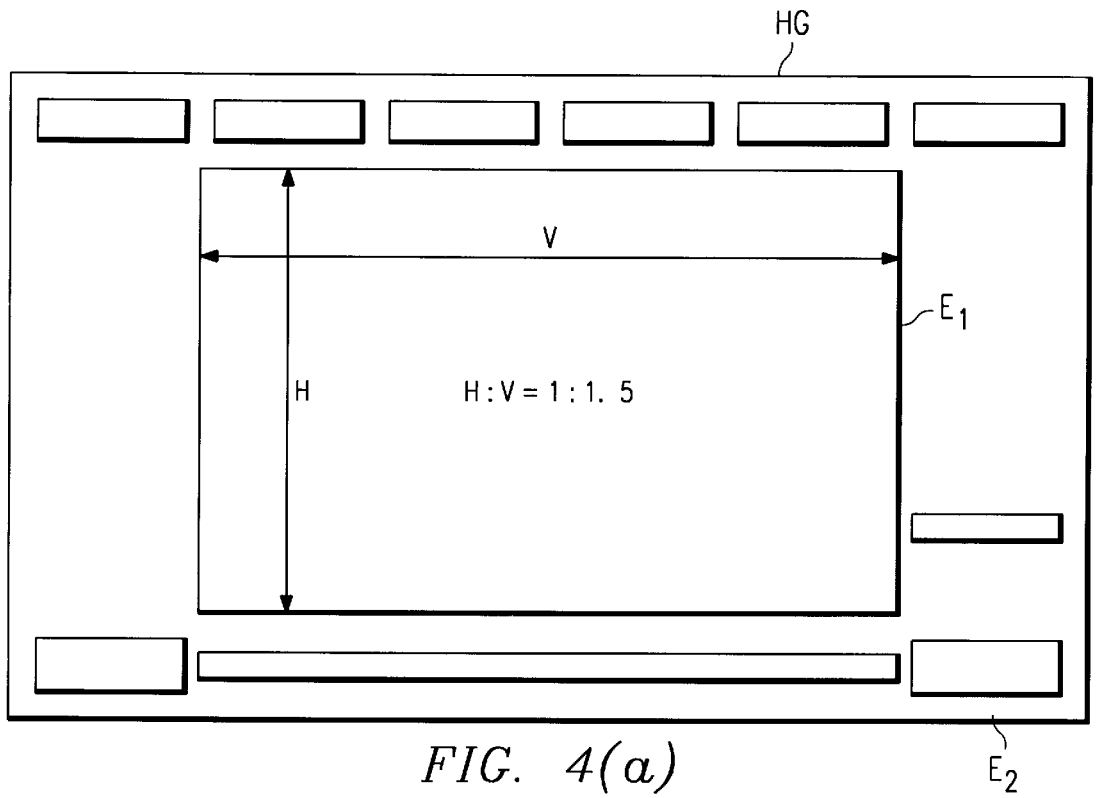
FIGS. 4(a) and 4(b) are diagrams showing examples of setting of an image display region.
Figure 4B:
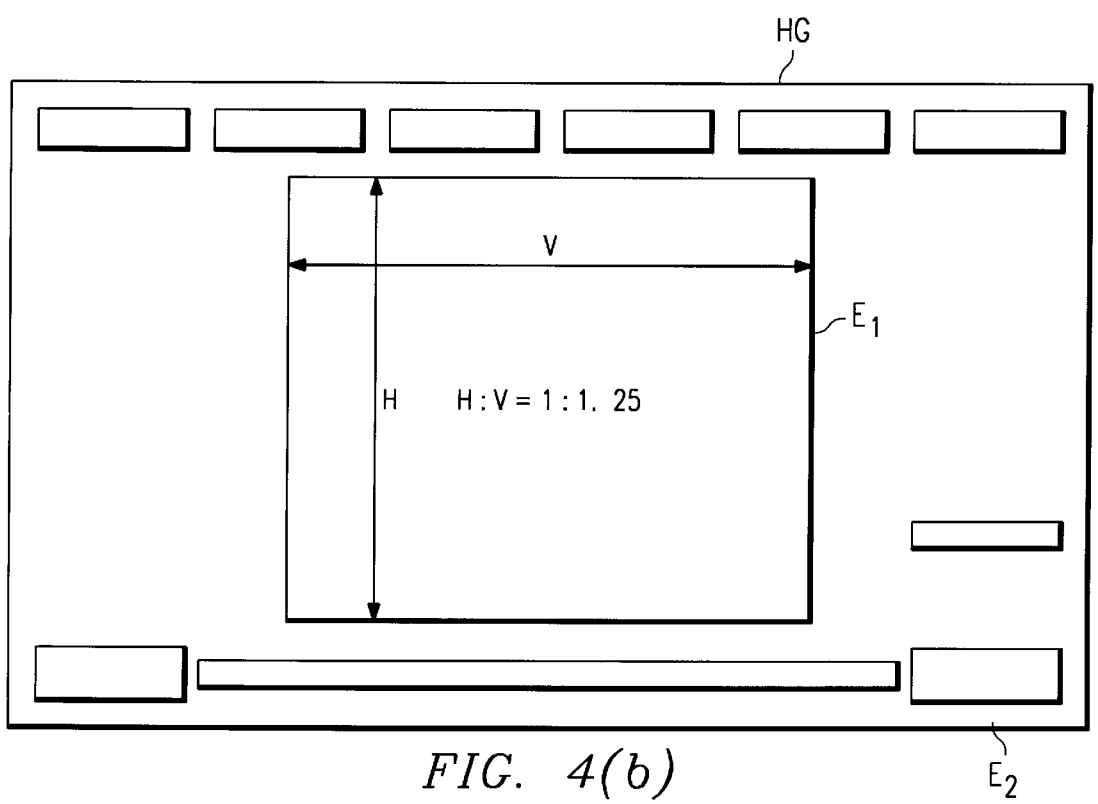

The size of such image display region E1 is changed according to the size of the film F attached. In other words, when the negative and positive films F1 and F1p of 35 mm and the film F2 of 6 cm are attached, a square region with a ratio of length to breadth of 1.5 is set as the image display region E1 on the display screen GH as shown in FIG. 4(a). When the film F3 of 4×5 in. is attached, a square region with a ratio of length to breadth of 1:1.25 is set as the image display region E1 as shown in FIG. 4(b).

Herein, a ratio of length to breadth of the image display region E1 is fixed to that of an image to be read. Also the image display region E1 is set to a predetermined size irrespective of the size of an image to be read. Therefore, a small image to be read is more largely expanded as compared with a large image and both images are displayed in the same area. For example, the same area of image display regions of a ratio of length to breadth of 1:1.5 are set for a film of 35 mm and a film of 6 cm, on which region an image on the film is displayed.

Figure 3:
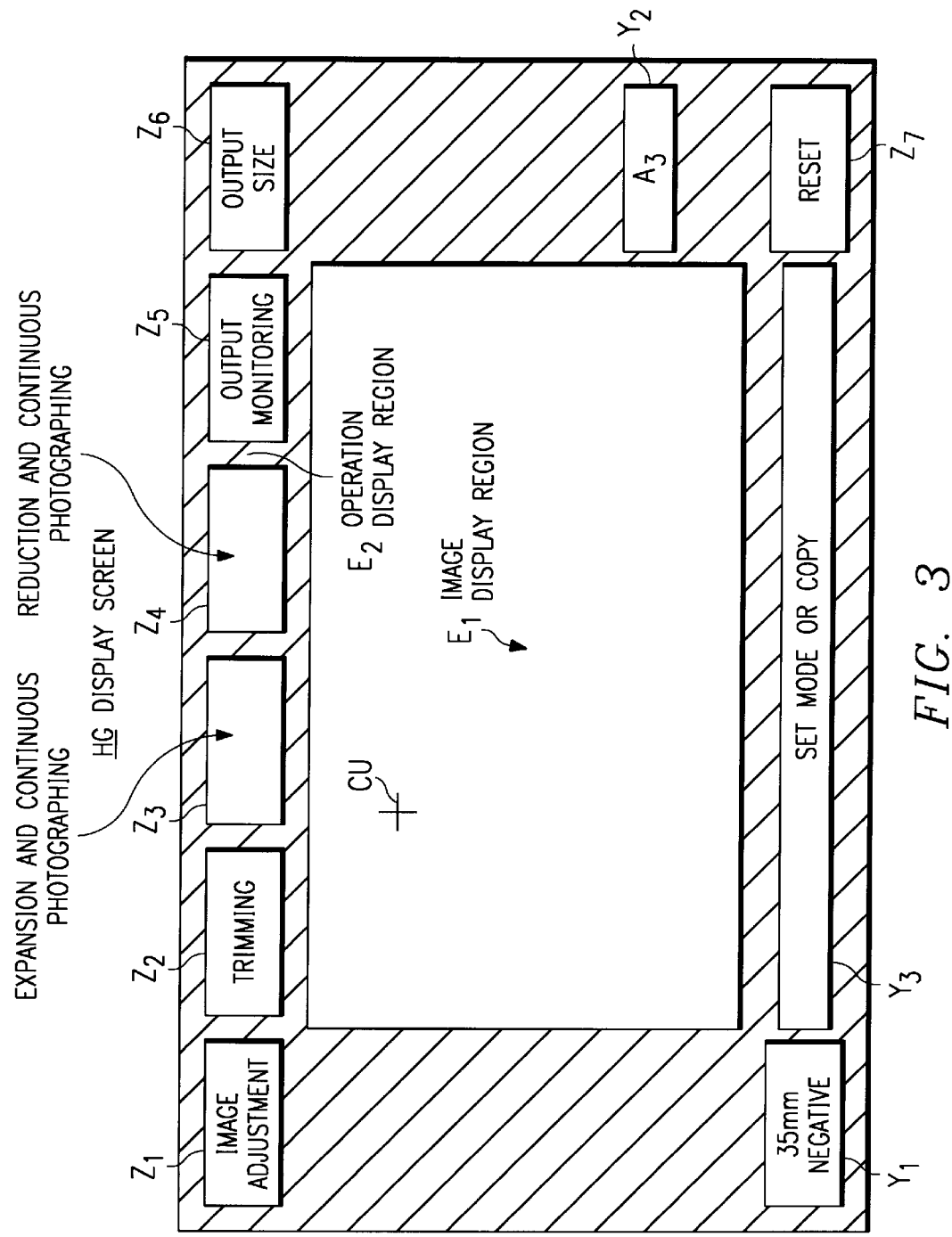
FIG. 3 is a diagram showing one example of a display screen.

Back to FIG. 3, displayed in the operation display region E2 are selection items (operation buttons) Z1–Z7 corresponding to various functions related to printing-out, a character Y1 indicative of a type of a film F attached, a character Y2 indicative of a size of paper used for printing-out and a message sentence Y3 for explaining an operation.

The selection item Z1 corresponds to an image adjusting function of arbitrarily adjusting tone of an image, the selection item Z2 corresponds to a trimming function, the selection item Z3 corresponds to an expansion and continuous image forming function for expanding and dividing one film image and printing out the on a plurality of separate sheets of paper and the selection item Z4 corresponds to a reduction and continuous image forming function for reducing and dividing a film image and printing out a plurality of film images on a sheet of paper. The selection item Z5 corresponds to an output monitoring function of displaying a relationship between a size of an image to be output and a size of a sheet of paper on the screen. The selection item Z6 corresponds to an output size function for designating a size of a sheet of paper. The selection item Z7 corresponds to a resetting function for resetting selection of each function.

Displayed on the display screen HG together with an image and the selection items Z1–Z7 is a cursor CU. An operator moves the cursor CU to an arbitrary position on the display screen HG by using the track ball 71 on the operation panel OP and presses the enter key 72 to designate a position, thereby selecting the selection items Z1–Z7 or designating a region of the image.

At this time, in the film scanner 1 of the present embodiment, when the cursor CU is located within the image display region E1, an operation state (mode) is set similarly to a case where the selection item Z2 is selected. In other words, only by moving the cursor CU to the image display region E1, a trimming mode is automatically set to enable designation of a trimming region. The trimming mode is released by moving the cursor to the outside of the image display region E1 (that is, the operation display region E2), to enable selection of a desired function.

Then, in order to enable an operator to recognize at a glance whether the trimming mode is set or not, the cursor CU is displayed to have a shape indicative of a trimming mode inside the image display region E1 and is displayed as an arrow shape for a mode selection within the operation display region E2. In FIG. 3, shown is the cursor CU of cross-shape in an initial state of the trimming mode, that is, in a state prior to designation of a trimming region.

A procedure of an operation relating to the trimming mode will be described.

When the operator intends to trim a film image, he or she designates two points by using the track ball 71 and the enter key 72 to designate a trimming region after the film image is displayed in the image display region E1 on the display frame HG as is described above.

Figure 5A:
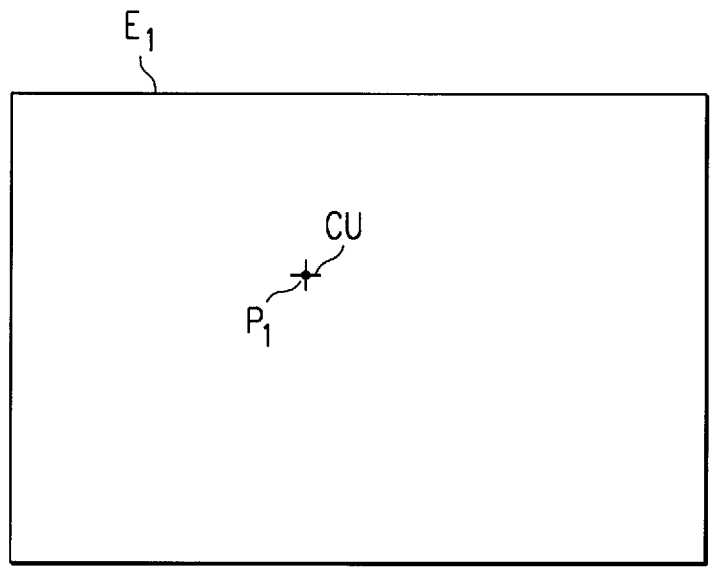
FIGS. 5(a) and 5(b) are diagrams showing a procedure of designating a trimming frame.

More specifically, as shown in FIG. 5(a), the operator first moves the cursor CU (with the cross-shape at this time) to a point P1 which is the end point of a desired trimming region, and turns on the enter key 72.

Figure 5B:
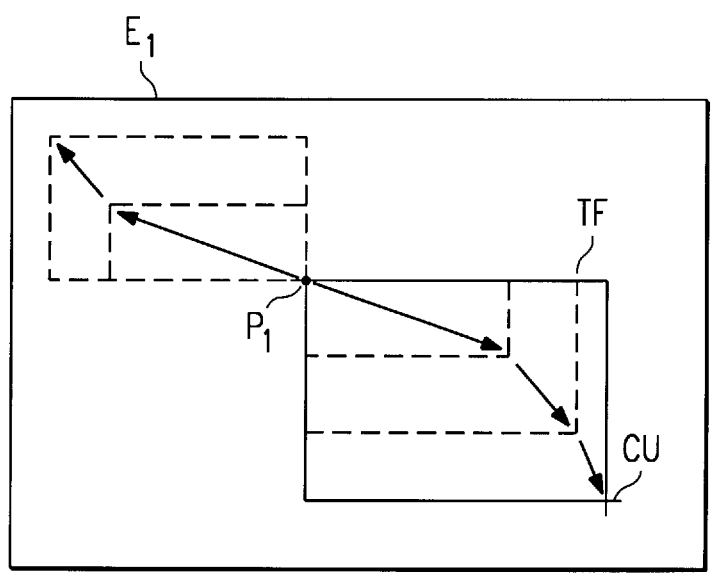

Then, when the operator moves the cursor CU, a trimming frame TF is displayed which is a square with the point P1 and the cursor position as diagonal points as shown in FIG. 5(b). The trimming frame TF is changed according to the movement of the cursor CU.

Then, with the trimming frame TF coincident with the desired trimming region, the operator turns on the enter key 72. As a result, the region of the trimming frame TF is designated as the trimming region.

Thereafter, when a position of the trimming region is to be changed, the cursor CU is moved to an arbitrary position within the trimming frame TF and the enter key 72 is turned on in that state as shown in FIG. 6(*a*). Then, the trimming frame TF is allowed to shift. In FIG. 6, the cursor CU is shown larger than an actual size with respect to the image display region E1.

In this state, an operation of the track ball 71 leads to a shift of the trimming frame TF without being varied in conjunction with the cursor CU. Therefore, the operator adequately shifts the trimming frame TF to set a trimming region at an arbitrary position.

In the foregoing trimming mode operation, the film scanner 1 has a range of a movement of the trimming frame TF limited to the image display region E1. In other words, an allowable extent of a movement of the trimming frame TF falls within the image display region E1 set according to a size of a film image as described above. Thus, it is not possible that the operator designates a portion other than the film image as a trimming region by mistake, so that the operator can proceed with the operations without anxiety.

Furthermore, in order to enhance operability in shifting the trimming frame TF, the cursor CU in the film scanner 1 is switched to have an arrow-shape indicative of an allowable shift direction according to a position of the trimming frame TF as shown in FIGS. 6(*b*)–(*j*).

For example, as shown in FIG. 6(*b*), when the trimming frame TF is located at the center of the image display region E1 and is allowed to be shifted upward and downward, and rightward and leftward, the cursor CU is displayed in a shape having four arrows corresponding to the up and down, and right and left directions. When the upper edge of the trimming frame TF is in contact with the edge of the image display region E1, where an upper movement is impossible, the cursor CU is displayed in a shape having three arrows corresponding to the down and right, and left directions.

Control by the CPU 201 will be described following the flow chart.

Figure 8:
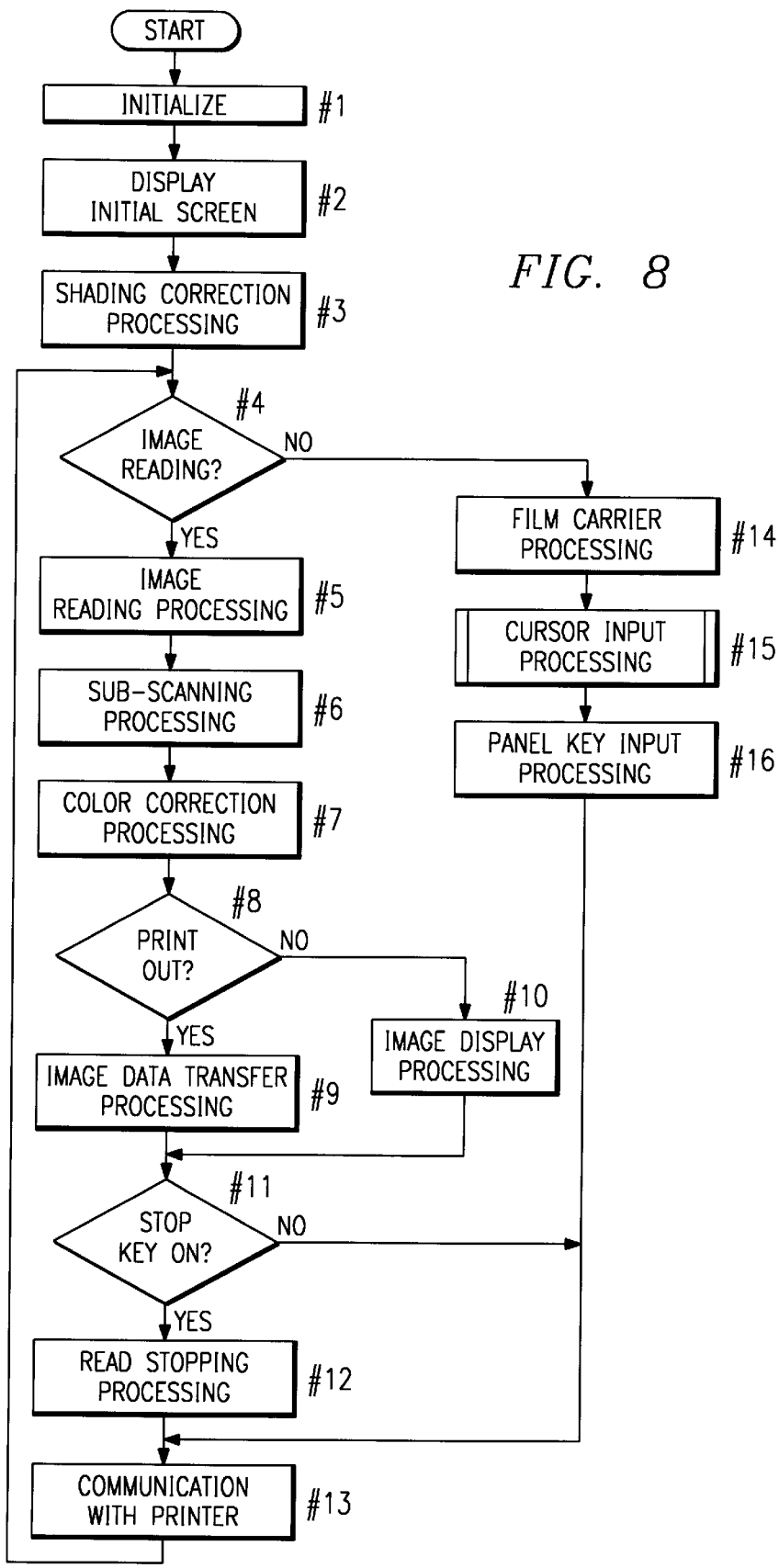
FIG. 8 is a main flow chart showing a schematic operation of a CPU.

FIG. 8 is a main flow chart showing a schematic operation of the CPU 201.

When power is applied to start a program, initialization for initializing a state of each unit is first carried out (step #1), an initial screen is displayed on the display screen HG of the CRT display 20 (step #2) and a processing for shading correction in the image input unit 221 is performed (step #3).

Then, determination is made whether a film image is being read or not (step #4). If it is being read, an image reading processing (step #5) for controlling a signal processing by the image input unit 221, a subscanning processing (step #6) for controlling drive of the scanner 18 and a color correction processing (step #7) are sequentially performed.

Subsequently, determination is made whether the reading of the present time is for printing-out or not (step #8). In other words, determination is made whether the reading is being carried out in response to turning-on of the print key 74.

If the determination result is YES at step #8, an image data transferring processing for outputting image information to the printer is carried out (step #9). If the determination result is NO at step #8, an image displaying processing for displaying the read image is carried out (step #10).

Then, determination is made whether the stop key 75 is turned on (step #11). When the stop key 75 is turned on, a read stopping processing is carried out (step #12). Thereafter, a processing for communicating with the printer is carried out (step #13) to return to step #4.

On the other hand, when the determination result is NO at step #4, a film carrier processing (step #14) for sensing a film size according to a combination of output states of the respective light receiving elements 55 to 57 of the film size sensor 50, a cursor input processing (step #15) relating to position designation by the cursor CU and a panel key input processing (step #16) for accepting a key operation on the operation panel OP are sequentially performed, and then the program proceeds to step #13.

Figure 9:
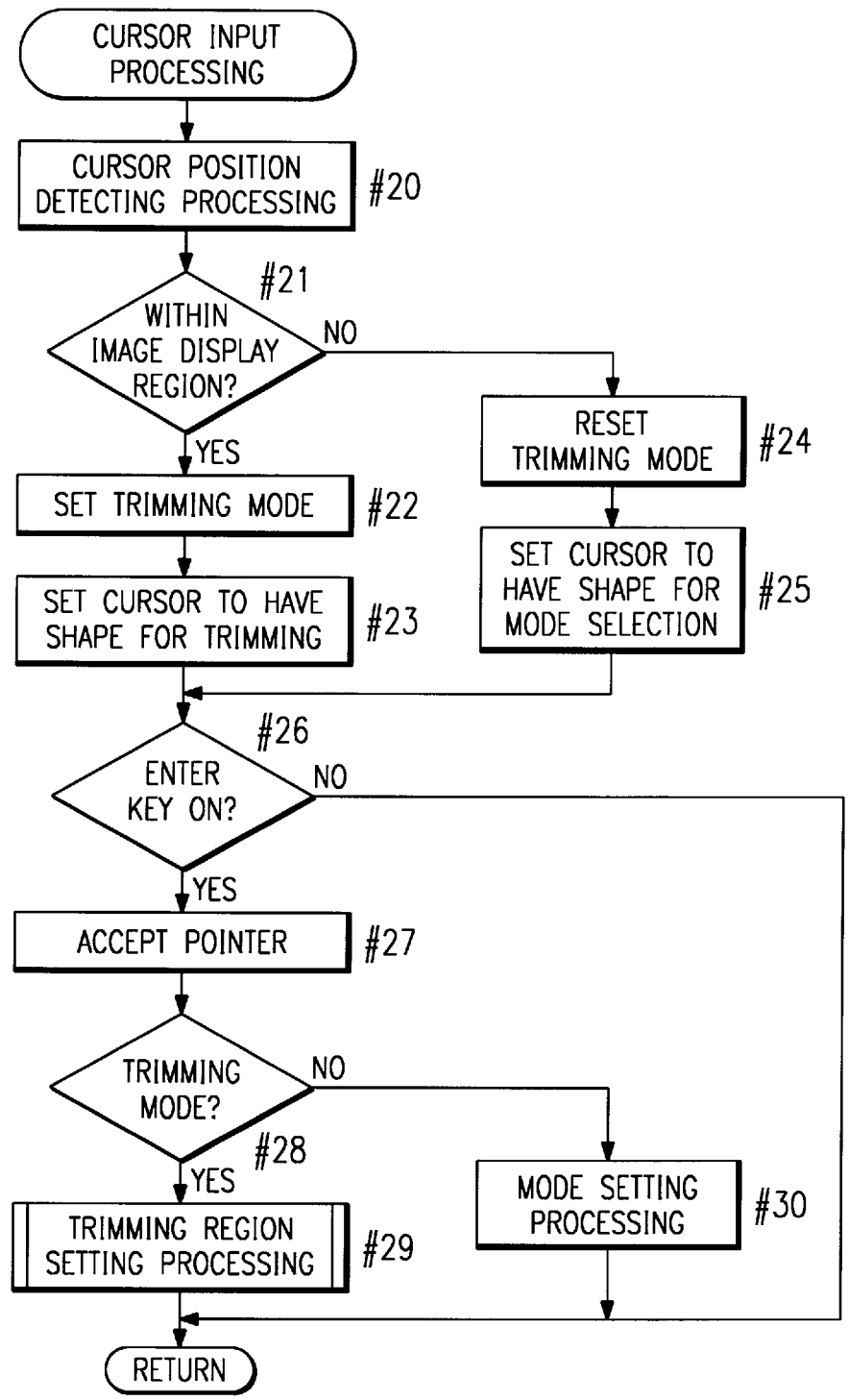
FIG. 9 is a flow chart of a cursor input processing.

FIG. 9 is a flow chart of a cursor input processing of FIG. 8.

First, a cursor position detecting processing is carried out for detecting a present position of the cursor CU on the display screen HG, the position corresponding to an XY coordinate plane (the upper left end as an origin) and then, determination is made based on the detection result whether the position of the cursor CU is in the image display region E1 (step #20, step #21).

If the determination result is YES at step #21, the trimming mode is set and the cursor CU is set to have a shape indicative of the trimming mode as described above (step #22, step #23). If the determination result is NO at step #21, the trimming mode is reset and the cursor CU is set to have a shape for the mode selection (step #24, step #25).

Figure 10A:
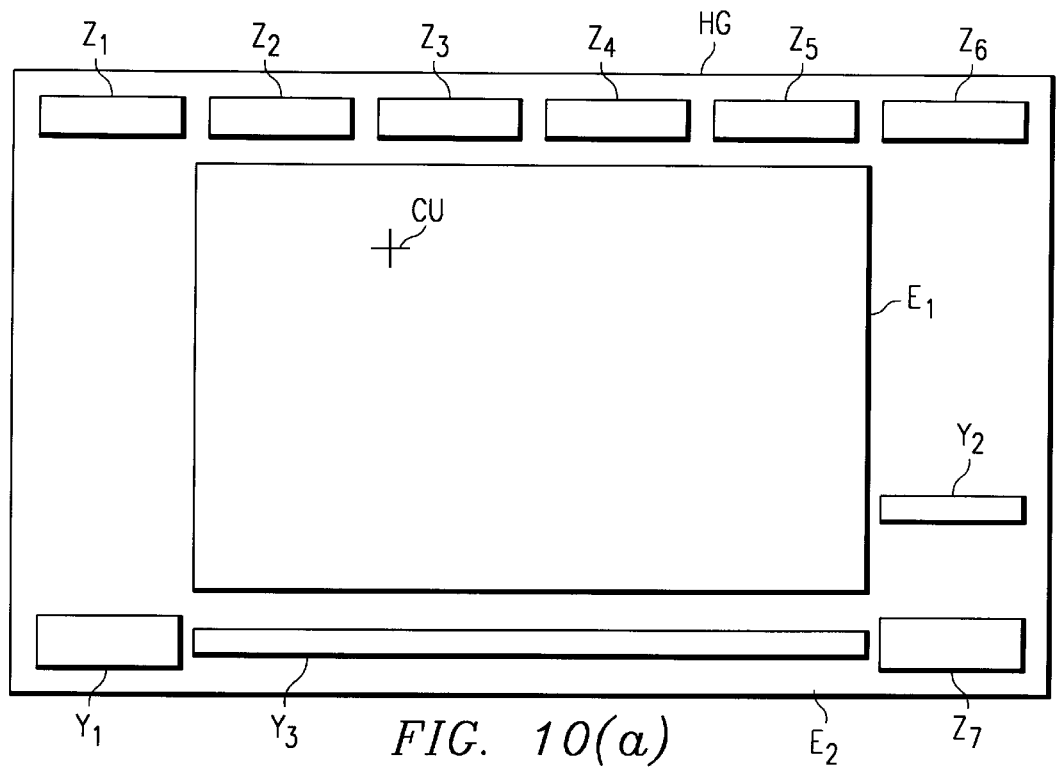
FIGS. 10(a) and 10(b) are diagrams showing a state of the cursor in each mode.
Figure 10B:
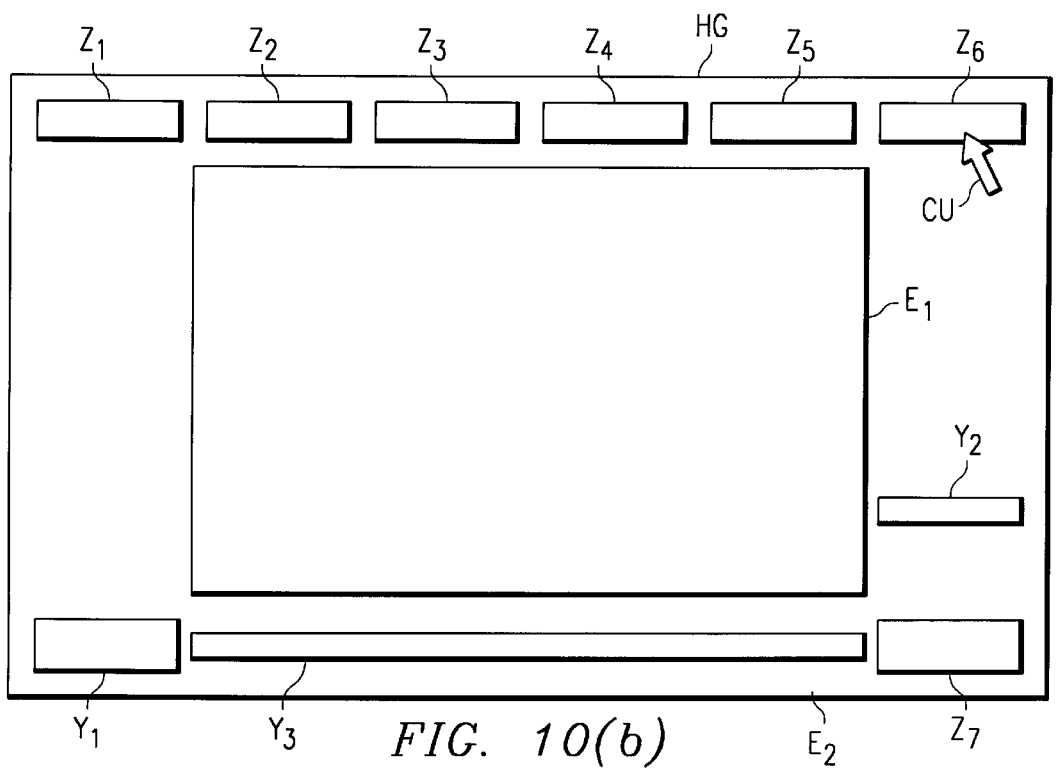

Then, in order to allow the operator to recognize at a glance whether the trimming mode is set or not, the cursor CU is displayed with a cross-shape for the trimming mode in the image display region E1 as shown in FIG. 10(*a*), and it is displayed with an arrow shape for the mode selection in the operation display region E2 as shown in FIG. 10(*b*).

Then, determination is made whether the enter key 72 is turned on (step #26). If the enter key 72 is turned on, coordinates (a pointer) corresponding to the then position of the cursor CU are input (step #27).

Then, determination is made whether the trimming mode is set or not (step #28). If it in the trimming mode, a trimming region setting processing is carried out (step #29) and if not, a mode setting processing is carried out for setting an operation mode corresponding to each function according to a selection among the above-described selection items Z1–Z7 (step #30).

Since the expansion and continuous image forming function and the reduction and continuous image forming function are alternative in the mode setting processing, if a selection of one of the functions is followed by a selection of the other function, a mode setting of the first selected function is reset to render the following selection effective, whereby a mode setting of the other function is carried out.

Figure 11:
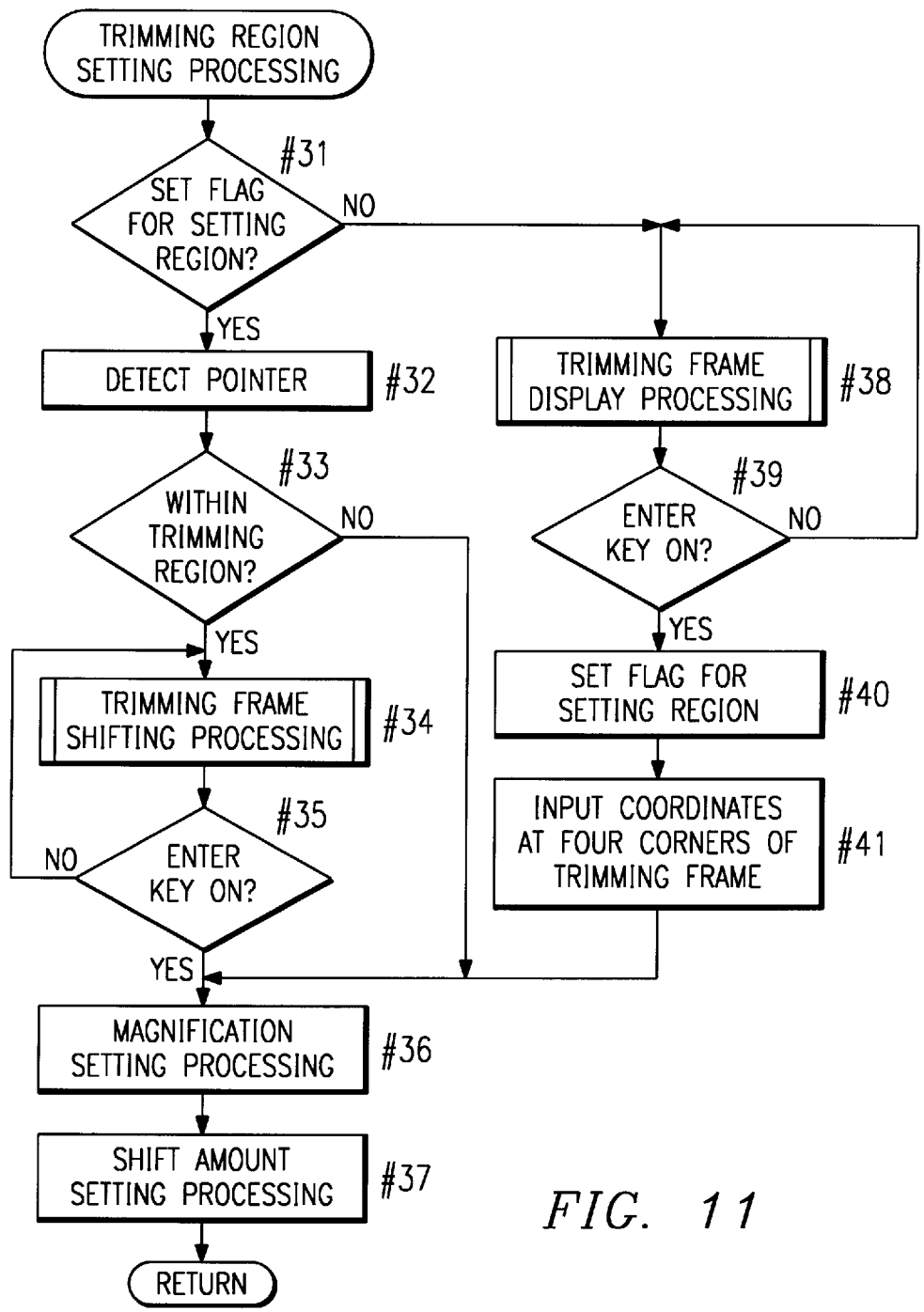
FIG. 11 is a flow chart of a trimming region setting processing.

FIG. 11 is a flow chart of a trimming region setting processing of FIG. 9.

First, determination is made whether a region setting flag is set (step #31).

If the determination result is YES at step #31, meaning that the trimming region is already set, the following processing related to a shift of the trimming region is carried out.

That is, the pointer is detected (step #32). If the pointer is located in the trimming region, a trimming frame shifting processing for shifting the trimming frame TF on the display screen HG in response to an operation of the track ball 71 will be repeatedly carried out until the enter key 72 is turned on (steps #33–#35).

Upon turning-on of the enter key 72 at the end of the operation for shifting the trimming frame, the program proceeds to step #36 where a print magnification is set according to an area of the trimming region and a paper size. Subsequently at step #37, a shift amount of an image to be printed out on a predetermined position of the paper is set according to the position of the trimming region.

On the other hand, when the determination result is NO at step #31, the following process related to setting of a new trimming region will be performed.

First carried out is a trimming frame displaying process for displaying, as a trimming frame TF, a square with a first point designated in the image display region E1 and a second point which is the position of the cursor as orthogonal points (step #38). At this time, the trimming frame TF is changed as the second point moves in response to the above-described cursor shifting operation.

Thereafter, when the enter key 72 is turned on to define the second point, a region setting flag is set and pointers at the four corners of the trimming frame at that time are input (steps #39–#41). Then, the program proceeds to the above step #36.

A shift of the trimming frame is activated by turning on the enter key with a cursor being shifted to an arbitrary position in the trimming frame. In other words, a trimming frame is formed at step #39, processings of steps #40, 41, 36 and 37 are carried out and then, the program returns to step #26 where turning-on of the enter key is detected. When the enter key is turned on, if the cursor at this time is located in the trimming region (YES at step #33), the trimming frame is shifted at step #34.

Figure 12:
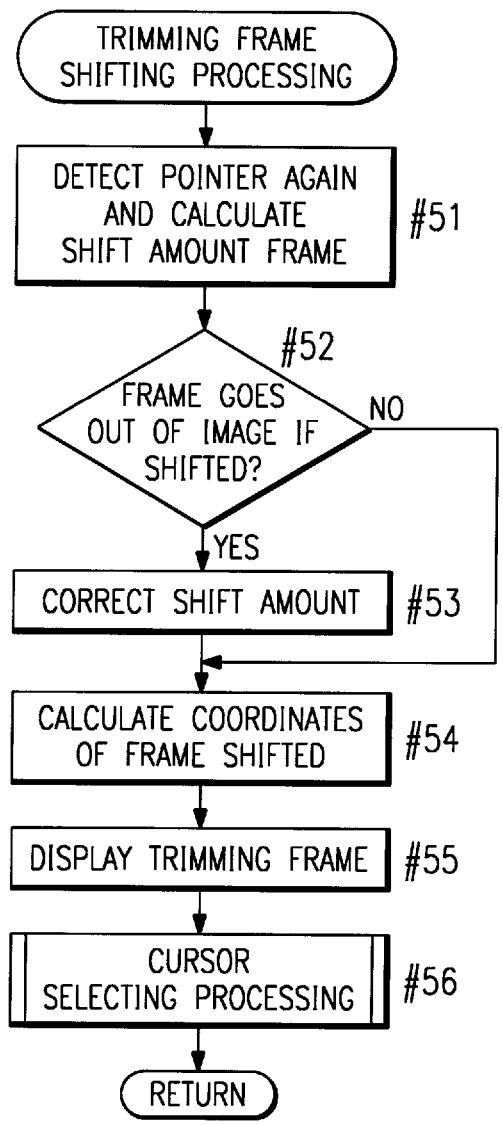
FIG. 12 is a flow chart of a trimming frame shifting processing.

FIG. 12 is a flow chart of the trimming frame shifting processing of FIG. 11.

First, cursor shift amounts in the X direction (a lateral direction on the screen) and the Y direction (the vertical direction on the screen) are calculated as a trimming frame TF shift amount based on the pointers which are previously input and the present pointers (step #51).

Then, determination is made whether the trimming frame TF would go out of the image display region E1 if the trimming frame TF is shifted by the shift amount based on a comparison of a value obtained by adding the shift amount to coordinate values of right and left, and upper and lower edges of the present trimming frame TF with coordinate values of right and left, and upper and lower edges of the image display region E1 (step #52).

If the trimming frame TF would go out of the image display region, the shift amount is corrected such that the trimming frame TF will not go out of the image display region E1 (step #53).

Subsequently thereto, coordinate values of the four corners of the trimming frame TF which have been shifted are calculated by adding shift amounts corrected as required to coordinate values of the present trimming frame TF (step #54).

Then, a process (step #55) for displaying the shifted trimming frame TF and a cursor selecting processing (step #56) for displaying a cursor CU having a shape according to the position of the trimming frame TF, as described above, are sequentially performed.

Figure 13:
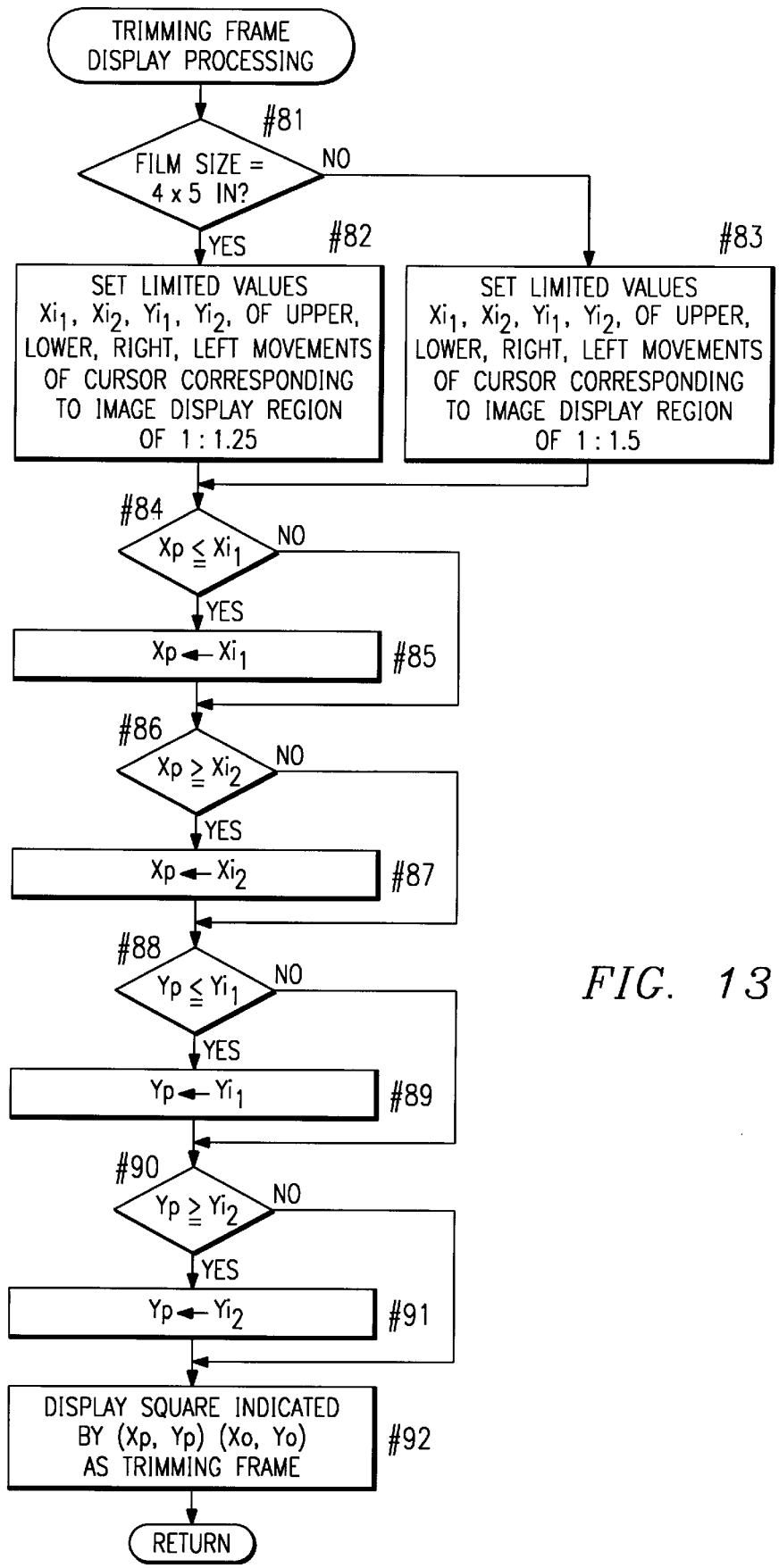
FIG. 13 is a flow chart of a trimming frame displaying processing.

FIG. 13 is a flow chart of the trimming frame displaying processing of FIG. 11.

First, determination is made whether the film size is 4×5 in. (step #81). If the determination result is YES at step #81, X coordinate values of the right and the left edges and Y coordinate values of the upper and the lower edges of the image display region E1 of 1:1.25 shown in FIG. 4(b) are selected as limited values Xi1, Xi2, Yi1 and Yi2 of rightward and leftward, and upward and downward movements of the cursor, respectively (step #82). If the determination result is NO at step #81, X coordinate values of the right and the left edges and Y coordinate values of the upper and the lower edges of the image display region E1 of 1:1.5 shown in FIG. 4(a) are selected as the limited values Xi1, Xi2, Yi1 and Yi2 of rightward and leftward, and upward and downward movements of the cursor, respectively (step #83).

Then, processing is carried out for not jotting the trimming frame TF out of the right and left, and the upper and lower sides of the image display region E1 (steps #84–#91). More specifically, if an X coordinate value Xp of the present cursor CU is not more than the limited value Xi1, the value Xp is replaced by the limited value Xi1 and if the value Xp is not less than the limited value Xi2, the value Xp is replaced by the limited value Xi2. If a Y coordinate value Yp of the cursor CU is not more than the limited value Yi1, the value Yp is replaced by the limited value Yi1 and if the value Yp is not less than the limited value Yi2, the value Yp is replaced by the limited value Yi2.

Subsequently, a processing is carried out for displaying, as a trimming frame TF, a square with the coordinates (Xp, Yp) and the coordinates (Xo, Yo) of the previous cursor CU as orthogonal points (step #92).

Figure 14A:
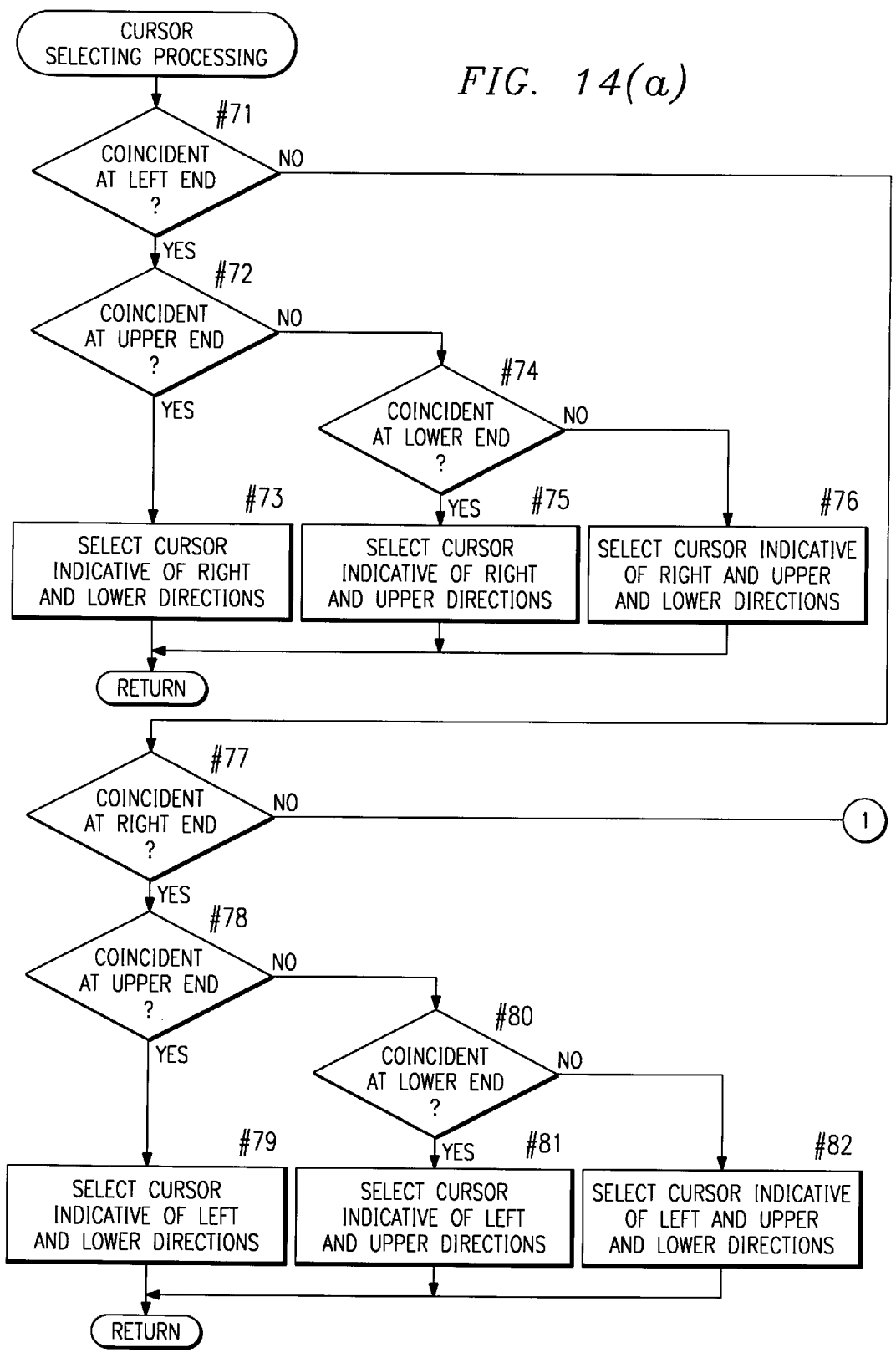
FIGS. 14(a) and 14(b) are flow charts of a cursor selecting processing.
Figure 14B:
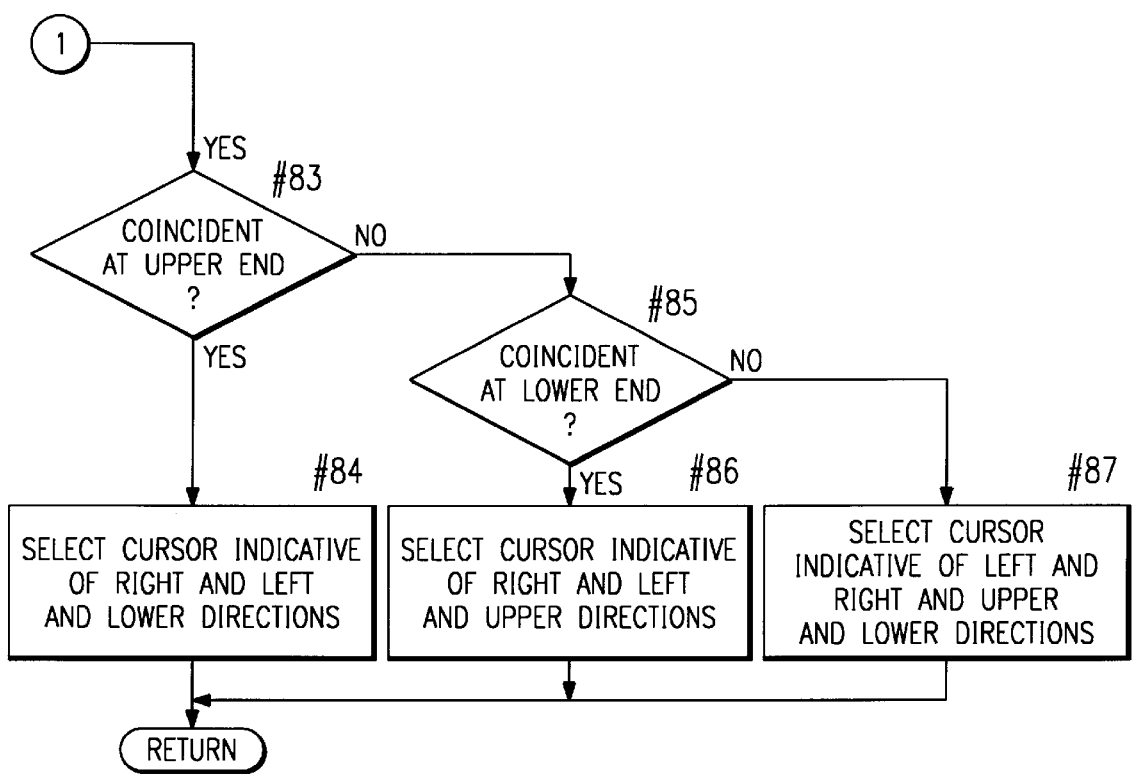

FIGS. 14A and 14B are flow charts of the cursor selecting processing of FIG. 12.

In this routine, determination is made whether upper and lower, and right and left edges of the trimming frame TF respectively coincide with upper and lower, and right and left edges of the image display region E1, and a cursor CU having an arrow directing a predetermined direction is selected according to a combination of coincident edges, as described above with reference to FIG. 5.

Figure 6A:
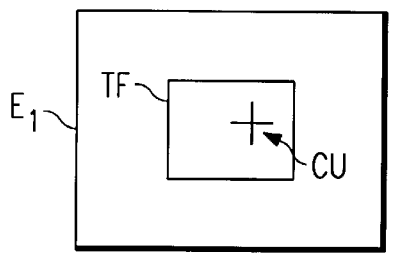
FIGS. 6(a)–6(j) are diagrams showing how the trimming frame is shifted.
Figure 6F:
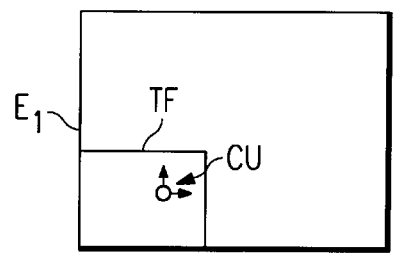
Figure 6B:
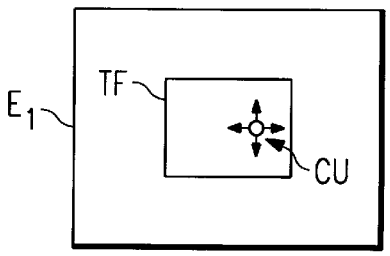
Figure 6G:
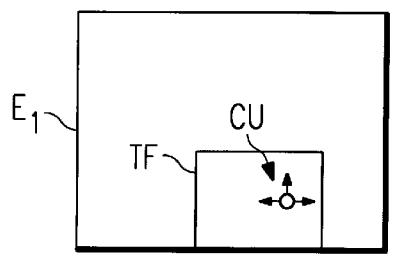
Figure 6C:
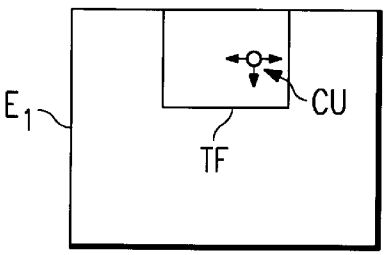
Figure 6H:
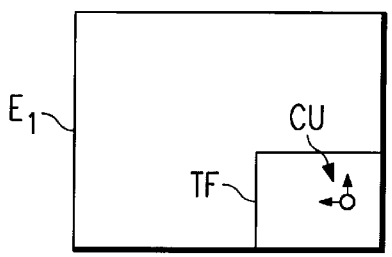
Figure 6D:
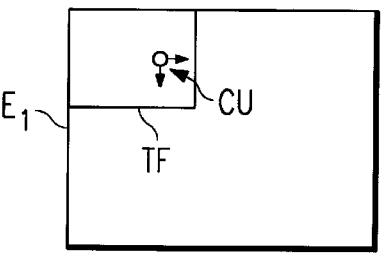
Figure 6I:
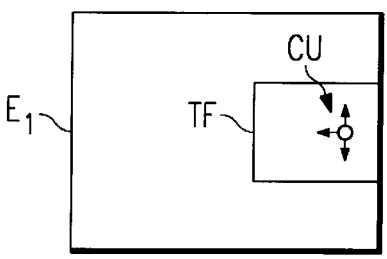
Figure 6E:
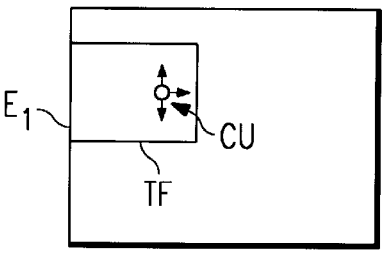
Figure 6J:
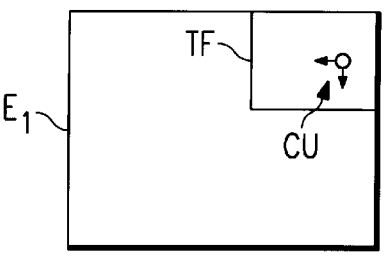

When the left edge and the upper edge coincide with each other, for example, a cursor CU shaped to direct the right direction and the lower direction as shift directions is selected as shown in FIG. 6(d) (steps #71–#73). When the right edge and the lower edge coincide with each other, a cursor CU shaped to direct to the left and the upper directions as shift directions is selected as shown in FIG. 6(h) (steps #77, #80 and #81).

Although the above embodiment shows, as an example, the film scanner 1 having a trimming function as an image editing function which requires designation of a region of an image, the present invention is also applicable to an image editing apparatus having a masking function which removes a part of an image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image editing apparatus in which a read original image is displayed on a screen and setting of edition contents for editing the image is performed on the screen, the image editing apparatus comprising:

image reading means for reading said original image,
   a display screen having a first display region for displaying said read image and a second display region for displaying an edition function for setting edition contents for said read image, a cursor movable to arbitrary positions in said first display region and said second display region, designating means for designating an editing region in said read image by moving said cursor to said first display region, first selecting means for selecting one of a plurality of edition functions by moving said cursor to said second display region, and second selecting means for automatically selecting an edition function requiring designation of an editing region among the plurality of edition functions when said cursor is located in said first display region.

2. The image editing apparatus according to claim 1, further including resetting means for resetting an edition function selected by said second selecting means when said cursor moves from said first display region to said second display region.

3. The image editing apparatus according to claim 2, wherein said edition function selected by said second selecting means corresponds to a trimming function.

4. The image editing apparatus according to claim 1, wherein said edition function requiring designation of an editing region corresponds to a trimming function.

5. An image editing apparatus wherein a read image is displayed on a screen and setting of edition contents for the image is carried out on the screen, the image editing apparatus comprising:

image reading means for reading images from an image medium of different sizes;

a display screen having a display region for displaying a read image; and display means for displaying said read image in a selected display region, where a selectable display region has a particular display size said display region being automatically selected in accordance with a size of said read image, said read image being automatically enlarged or reduced in order to correspond to the display size of said selected display region.

6. An image editing apparatus wherein a read image is displayed on a screen and setting of edition contents of the image is carried out on the screen, the image editing apparatus comprising:

image reading means for reading image medium having different sizes and for generating image data from said medium, detecting means for automatically detecting an image medium size, a display screen having a selectable display region with a predetermined size for displaying an image representative of generated image data, wherein a display region is selected in accordance with a detected image medium size, and display means for selecting a display region and displaying said image in the entire display region irrespective of a size of the image, said image being automatically enlarged or reduced in order to correspond to the size of said entire display region.

7. An image editing apparatus is which a read original image is displayed on a screen and setting of edition contents for editing the image is performed on the screen, the image editing apparatus comprising:

image reading means for reading said original image;

a display screen having a first display region for displaying said read image and a second display region for displaying an edition function for setting edition contents for said read image;

a cursor movable to arbitrary positions in said first display region and said second display region;

designating means for designating an editing region in said read image by moving said cursor to said first display region;

first selecting means for selecting one of a plurality of edition functions by moving said cursor to said second display region; and second selecting means for automatically selecting an edition function requiring designation of an editing region among the plurality of edition functions according to a movement of said cursor from said second display region to said first display region.

8. The image editing apparatus according to claim 7, further including resetting means for resetting an edition function selected by said second selecting means according to a movement of said cursor from said first display region to said second display region.

* * * * *